US009723379B2

(12) United States Patent
German et al.

(10) Patent No.: US 9,723,379 B2
(45) Date of Patent: *Aug. 1, 2017

(54) AUTOMATED INFRASTRUCTURE MANAGEMENT SYSTEMS AND METHODS FOR ENABLING REAL TIME ENERGY MANAGEMENT

(71) Applicant: CommScope, Inc. of North Carolina, Hickory, NC (US)

(72) Inventors: Michael German, Secaucus, NJ (US); Niall McAndrew, Dublin (IE)

(73) Assignee: CommScope, Inc. of Norht Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,388

(22) Filed: Jan. 15, 2015

(65) Prior Publication Data

US 2015/0143153 A1    May 21, 2015

Related U.S. Application Data

(62) Division of application No. 13/353,808, filed on Jan. 19, 2012, now Pat. No. 8,954,763.

(Continued)

(51) Int. Cl.
*H04Q 1/02* (2006.01)
*G06F 1/32* (2006.01)

(52) U.S. Cl.
CPC ............ *H04Q 1/03* (2013.01); *G06F 1/3231* (2013.01); *H04Q 1/136* (2013.01)

(58) Field of Classification Search
CPC ...... G06F 1/266; G06F 1/3203; G06F 1/3206; G06F 1/3209; G06F 1/3231; H04Q 1/03; H04Q 1/136

See application file for complete search history.

(56) References Cited

U.S. PATENT DOCUMENTS 6,784,802 B1    8/2004  Stanescu
7,155,622 B2   12/2006  Mancey et al.
(Continued)

FOREIGN PATENT DOCUMENTS

CN    101027873         8/2007
EP     1734 692 A1    12/2006
WO    2006023868        3/2006

OTHER PUBLICATIONS

Cisco EnergyWise: Power Management Without Borders (White Paper); 2010 Cisco Systems, Inc.; pp. 1-11.
(Continued)

*Primary Examiner* — Dennis M Butler
(74) *Attorney, Agent, or Firm* — Fogg & Powers LLC

(57) ABSTRACT

Automated infrastructure management systems and methods document infrastructure elements within a facility, provide a comprehensive record of all network-connected equipment within a facility, and facilitate trouble shooting of network-connected equipment. An automated infrastructure management system includes a plurality of intelligent patch panels, each comprising a plurality of connector ports connected to individual communication channels of a network, a controller in communication with at least some of the intelligent patch panels that obtains connectivity information for the intelligent patch panel's ports, and management software in communication with the controller. The management software performs various functions including correlating the interconnection information for the intelligent patch panels with the physical location information for telecommunications in its database, applying energy management policies to a respective communication channel, providing real time physical location information for devices connected to communication channels to a network switch, and displaying real time physical location information of the devices.

13 Claims, 17 Drawing Sheets

Related U.S. Application Data

(60) Provisional application No. 61/436,662, filed on Jan. 27, 2011.

(56) References Cited

U.S. PATENT DOCUMENTS

| | | | |
|---|---|---|---|
| 7,297,018 | B2 | 11/2007 | Caveney et al. |
| 7,550,870 | B2 | 6/2009 | Reynolds et al. |
| 7,672,104 | B2 | 3/2010 | Reynolds et al. |
| 7,978,845 | B2 | 7/2011 | Caveney et al. |
| 8,954,763 | B2 * | 2/2015 | German .......... H04Q 1/136 713/300 |
| 2004/0193329 | A1 | 9/2004 | Ransom et al. |
| 2005/0039040 | A1 | 2/2005 | Ransom et al. |
| 2006/0047800 | A1 | 3/2006 | Caveney et al. |
| 2006/0282529 | A1 | 12/2006 | Nordin |
| 2009/0112373 | A1 | 4/2009 | Feldman et al. |
| 2010/0141379 | A1 | 6/2010 | Tucker et al. |
| 2010/0171602 | A1 * | 7/2010 | Kabbara .......... G06F 1/266 340/333 |
| 2012/0054507 | A1 | 3/2012 | Noel |

OTHER PUBLICATIONS

Lippis, III, Nicholas John; Controlling Corporate Energy Consumption via the Enterprise Network—*A New Approach to Achieving Energy Efficiency by Leveraging Network Infrastructure*; Jan. 2009; 14 pages, A Lippis Consulting Industry Paper.

PM8 by Cyber Switching—Energy Management Control (data sheet); www.cyberswitching.com; 1 page.

Redwood Systems Overview: Internetworked DC Grids Can Save Energy; Mar. 8, 2010; pp. 1-8; Redwood Systems, Inc.; Fremont, CA.

Invitation to Pay Additional Fees Corresponding to International Application No. PCT/US2012/021998; Date of Mailing: May 25, 2012; 7 Pages.

China Patent Office, "First Office Action for CN Application No. 201280006598.4", "from Foreign Counterpart to U.S. Appl. No. 13/353,808", Mar. 2, 2016, pp. 140, Published in: CN.

China Patent Office, "Second Office Action for CN Application No. 201280006598.4", "from U.S. Appl. No. 13/353,808", Nov. 2, 2016, pp. 1-37, Published in: CN.

U.S. Patent Office, "Notice of Allowance", "from U.S. Appl. No. 13/353,808", Oct. 6, 2014, pp. 1-5, Published in: US.

U.S. Patent Office, "Office Action", "from U.S. Appl. No. 13/353,808", Aug. 4, 2014, pp. 1-14, Published in: US.

International Search Authority, "International Search Report for PCT Application No. PCT/US2012/021998", "from Foreign Counterpart to U.S. Appl. No. 13/353,808", Aug. 2, 2012, pp. 1-5, Published in: WO.

International Search Authority, "Written Opinion for PCT Application No. PCT/US2012/021998", "from Foreign Counterpart to U.S. Appl. No. 13/353,808", Aug. 2, 2012, pp. 1-8, Published in: WO.

China Patent Office, "Office Action for CN Application No. 201280006598.4", "from Foreign Counterpart to U.S. Appl. No. 13/353,808", May 4, 2017, pp. 1-17, Published in: CN.

* cited by examiner

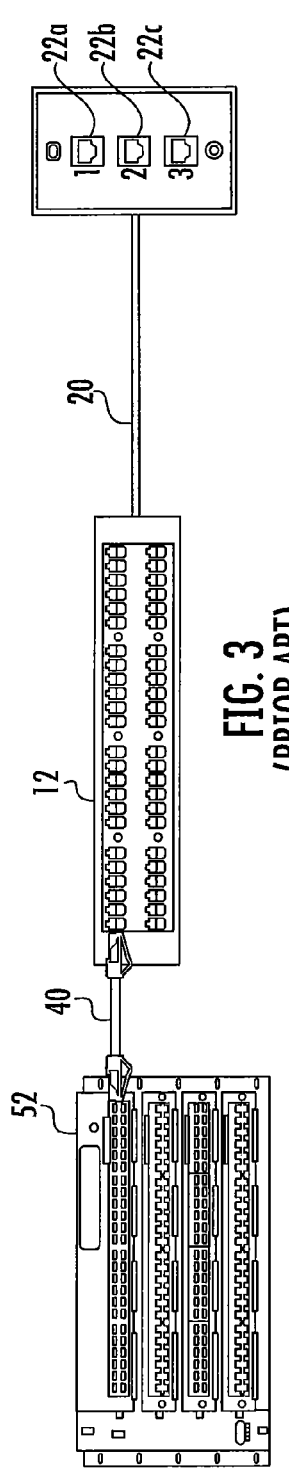
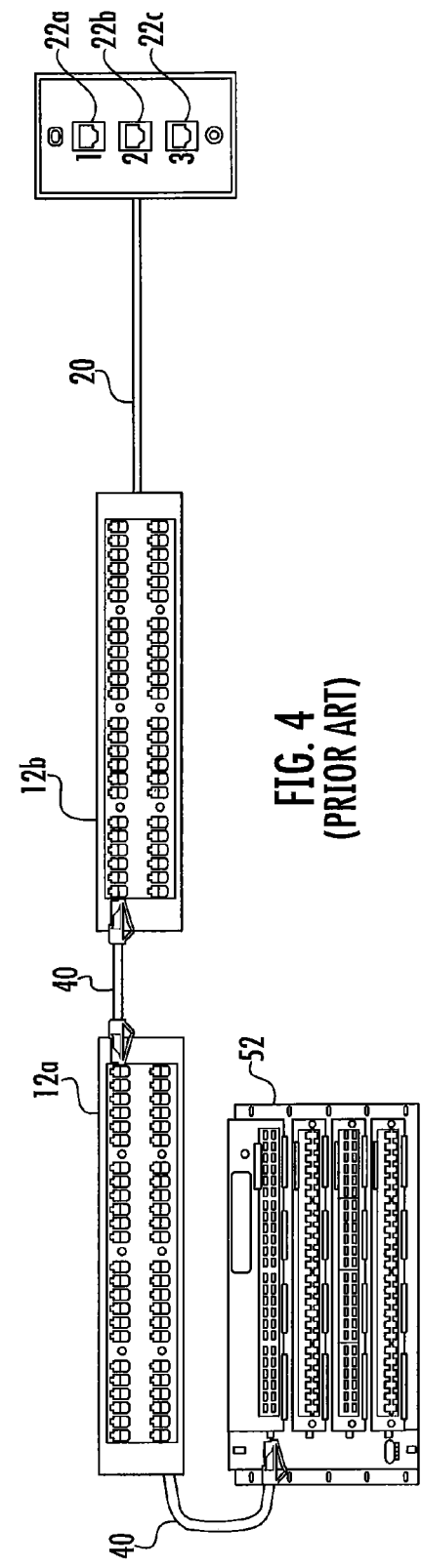

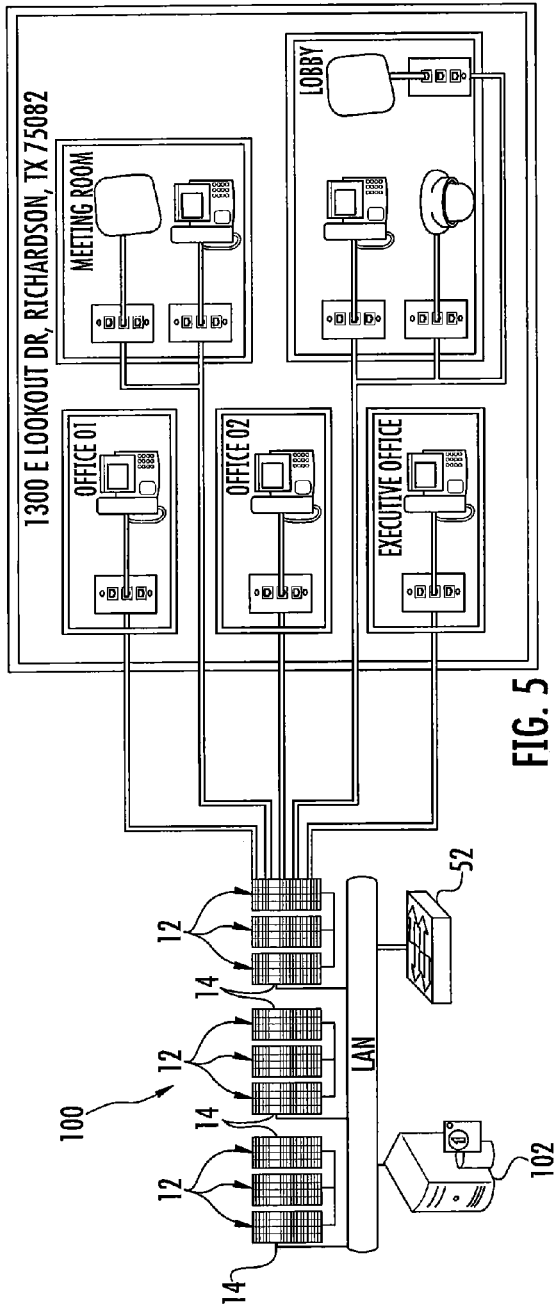

AUTOMATED INFRASTRUCTURE MANAGEMENT SYSTEMS AND METHODS FOR ENABLING REAL TIME ENERGY MANAGEMENT

CROSS-REFERENCE TO RELATED APPLICATIONS

This application claims priority under 35 U.S.C. §120 as a divisional application of U.S. patent application Ser. No. 13/353,808, filed Jan. 19, 2012, which in turn claims the benefit of and priority to U.S. Provisional Patent Application No. 61/436,662 filed Jan. 27, 2011, the disclosure of each of which is incorporated herein by reference as if set forth in their entireties.

FIELD OF THE INVENTION

The present invention relates generally to energy management and, more particularly, to energy management systems and methods.

BACKGROUND

Many businesses have dedicated communications systems that enable computers, servers, printers, facsimile machines and the like to communicate with each other, through a private network, and with remote locations via a telecommunications service provider. Such communications system may be hard wired through, for example, the walls and/or ceilings of the building that houses the business using communications cables that typically contain eight conductive wires. Conventionally, the eight conductive wires are arranged as four differential twisted pairs of conductors that may be used to transmit four separate differential signals. In such hard wired systems, individual connector ports such as RJ-45 style modular wall jacks (also referred to as telecommunications outlets) are mounted in offices throughout the building. The communications cables electrically connect each connector port to network equipment (e.g., network servers, switches, etc.) that may be located, for example, in a computer room. Communications cables from external telecommunication service providers may also terminate within the computer room.

The communication cables may be connected to the network equipment through a communications patching system. Typically, a communications patching system includes a plurality of "patch panels" that are mounted on one or more equipment racks. As is known to those of skill in the art, a "patch panel" refers to an inter-connection device that includes a plurality of connector ports such as, for example, RJ-45 style communications jacks, on a front side thereof. Each connector port (e.g., a jack) is configured to receive a first communications cable that is terminated with a mating connector (e.g., a plug). Typically, a second communications cable is terminated into the reverse side of each connector port by terminating the eight conductive wires of the cable into corresponding insulation displacement contacts of the connector port. Each connector port on the patch panel may provide communications paths between a communications cable that is plugged into the front side of the connector port and a respective one of the communications cables that is terminated into the reverse side of the connector port. The communications patching system may optionally include a variety of additional equipment such as rack managers, system managers and other devices that facilitate making and/or tracking interconnections between networked devices.

FIG. 1 is a simplified example of one way in which a communications patching system may be used to connect a computer (or other device) 26 located in an office 4 of a building to network equipment 52, 54 located in a computer room 2 of the building. As shown in FIG. 1, the computer 26 is connected by a patch cord 28 to a modular wall jack 22 that is mounted in a wall plate 24 in office 4. A communications cable 20 is routed from the back end of the modular wall jack 22 through, for example, the walls and/or ceiling of the building, to the computer room 2. As there may be hundreds or thousands of wall jacks 22 within an office building, a large number of cables 20 are routed into the computer room 2.

A first equipment rack 10 is provided within the computer room 2. A plurality of patch panels 12 are mounted on the first equipment rack 10. Each patch panel 12 includes a plurality of connector ports 16. In FIG. 1, each connector port 16 comprises a modular RJ-45 jack that is configured to receive a modular RJ-45 plug connector. However, it will be appreciated that other types of patch panels may be used such as, for example, patch panels with RJ-11 style connector ports 16, As shown in FIG. 1, each communications cable 20 that provides connectivity between the computer room 2 and the various offices 4 in the building is terminated onto the back end of one of the connector ports 16 of one of the patch panels 12. A second equipment rack 30 is also provided in the computer room 2. A plurality of patch panels 12' that include connector ports 16' are mounted on the second equipment rack 30. A first set of patch cords 40 (only two exemplary patch cords 40 are illustrated in FIG. 1) are used to interconnect the connector ports 16 on the patch panels 12 to respective ones of the connector ports 16' on the patch panels 12'. The first and second equipment racks 10, 30 may be located in close proximity to each other (e.g., side-by-side) to simplify the routing of the patch cords 40. In the simplified example of FIG. 1, the communication patching system comprises the patch panels 12, 12' and the patch cords 40.

As is further shown in FIG. 1, network equipment such as, for example, one or more switches 52 and network routers and/or servers 54 ("network devices") are mounted on a third equipment rack 50. Each of the switches 52 may include a plurality of connector ports 53. A second set of patch cords 60 connect the connector ports 53 on the switches 52 to the back end of respective ones of the connector ports 16' on the patch panels 12'. As is also shown in FIG. 1, a third set of patch cords 64 may be used to interconnect other of the connector ports 53 on the switches 52 with connector ports 55 provided on the network devices 54. In order to simplify FIG. 1, only a single patch cord 60 and a single patch cord 64 are shown. One or more external communications lines 66 may be connected to, for example, one or more of the network devices 54 (either directly or through a patch panel).

The communications patching system of FIG. 1 may be used to connect each computer, printer, facsimile machine, internet telephone and the like 26 located throughout the building to the network switches 52, the switches 52 to network routers 54, and the network routers 54 to external communications lines 66, thereby establishing the physical connectivity required to give devices 26 access to both local and wide area networks. In the communications patching system of FIG. 1, connectivity changes are typically made by rearranging the patch cords 40 that interconnect the connector ports 16 on the patch panels 12 with respective of the connector ports 16' on the patch panels 12'.

Power over Ethernet (PoE) is used to provide power to devices connected to a network via network cabling (also referred to as endpoint devices). Examples of remotely powered network devices may include, for example, voice over IP telecommunications equipment, wireless Local Area Network (LAN) access points, network cameras, among others. FIG. 2 is a block diagram illustrating an endspan system for providing PoE in accordance with conventional methods. An endspan PoE network switch 52 is communicatively coupled to a network patch panel 12. The endspan PoE network switch 52 is configured to provide data communications and/or power via PoE devices that are connected directly or indirectly (e.g., through additional cabling, connectors, patch panels and/or patch cords) to the network patch panel 12. A variety of remotely powered network devices may be connected to the network patch panel 12 including, for example, an IP telephone 70, a wireless LAN access point 72, and/or a network camera 74, among others.

Many organizations are beginning to utilize energy management techniques to control energy costs associated with communications networks and devices connected to and powered via communications networks. For example, energy management techniques are being utilized to set predefined, per-port power allocation; identify ports where power is not being used; reallocate power; and provide power prioritization. The Cisco® EnergyWise® energy management system is a conventional energy management system in use that measures power usage on a network. The Cisco® EnergyWise® system focuses on reducing power utilization on devices connected to a network ranging from PoE devices such as IP phones and wireless access points to IP-enabled building and lighting controllers, and allows optimization and control of power across an entire corporate infrastructure, potentially affecting any powered device.

Conventional energy management systems typically are based on dividing building space into domains (e.g., zones, areas, etc.), and applying generic energy management policies (EMPs) to devices located within these domains. These generic EMPs are entered manually into switches or devices during a network configuration process. However, when changes occur within a domain (i.e., movement of a device to another domain, etc.), manual reconfiguration may be required. For example if a phone, that was previously used by a help desk organization, is moved to another domain (e.g., an office area), an EMP that had been applied previously to this phone may have to be changed to reflect the phone's new usage. Similarly, re-configuration may be required for a network switch port in the case where its connecting circuit has changed.

Conventional energy management systems also typically require someone to track changes made to EMPs. As such, there are many tasks in conventional energy management systems that are dependent on manual activities, and that make these systems susceptible to human error which, in turn, may lead to incorrect EMP implementation.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Automated infrastructure management systems, according to some embodiments of the present invention, are provided that are capable of documenting infrastructure elements within a facility, providing a comprehensive record of all the network-connected equipment within a facility, and facilitating trouble shooting of network-connected equipment. Automated infrastructure management systems, according to embodiments of the present invention, have the capability to provide an automated method for discovering and documenting configuration of LAN and SAN (storage area network) switches, along with automatically discovering and documenting end devices that connect to a network. Automated infrastructure management systems, according to embodiments of the present invention, monitor patch connections between patch panel ports, generate alerts, and update documentation when any of these patch connections are changed.

According to some embodiments of the present invention, an automated infrastructure management system includes a plurality of intelligent patch panels, each comprising a plurality of connector ports connected to individual communication channels of a network, a controller in communication with at least some of the intelligent patch panels that obtains connectivity information for the intelligent patch panel's ports, and management software in communication with the controller. The management software, when executed by one or more processors, is configured to perform various functions including correlating the interconnection information for the intelligent patch panels with the physical location information for various devices in its database, and may also be configured to apply energy management policies, for example, an energy management policy obtained from an energy management system associated with a facility, to a respective communication channel. The management software may also be configured to provide real time physical location information for the devices connected to a communication channel to a network switch, for example, to a management information base (MIB) for a network switch. More specifically, real time physical location information for communication channels is provided to network switch ports associated with the communication channels. In addition, the management software may be configured to provide real time physical location information for the devices connected to the communication channels to an energy management system, such as a third party energy management system, and/or to any other third party software and/or system. The management software is also configured to display the real time physical location information of the devices connected to the communication channels in a user interface.

The management software may include many additional functions. For example, the management software may be configured to determine a physical location of a first device connected to a network based on a location of a second device connected to a communications channel, wherein the first device is a Power over Ethernet (PoE) device. As an example, a device, such as a computer (e.g., desktop computer, laptop computer etc.) may be connected to a network via a telecommunications outlet that is adjacent to a telecommunications outlet of a PoE device. The management software is configured to detect when the computer is connected to the network, determine the physical location of the computer, and identify any PoE devices at this location, such as an IP phone. The management software can then apply an exception to an energy management policy for the PoE device(s) at this location, provided that such an exception is authorized.

In other embodiments of the present invention, the management software is configured to apply Wake on Lan commands to devices connected to a communication channel via a Power over Ethernet (PoE) device. The management software may also be configured to apply power off commands to a device connected to a network via a daisy chain through a PoE device.

In other embodiments of the present invention, an electrical power management device is connected to the network and is configured to manage and monitor electrical power to a plurality of power outlets throughout a facility. The management software is configured to identify an electrical power management device port connected to a corresponding power outlet. In addition, the management software is configured to display a user interface that illustrates physical locations of each power outlet placed on a floor plan diagram or as part of hierarchical building locations tree. An energy management policy can be defined and assigned to each power outlet via the user interface, for example, based on physical location.

According to some embodiments of the present invention, an automated infrastructure management system that connects endpoint devices (e.g., wireless LAN access points, IP phones, ethernet/IP-based video surveillance cameras, etc.) and upstream devices in a network and that facilitates real time physical location mapping of a network, as well as implementation of real time energy management, includes a plurality of intelligent patch panels, a controller in communication with at least some of the intelligent patch panels, and a management server configured to execute management software. Each intelligent patch panel includes a plurality of connector ports connected to individual communication channels. A telecommunications outlet (e.g., a wall jack, etc.) is located at the end of at least some of the communication channels. A plurality of patch cords are utilized to selectively interconnect respective connector ports of the patch panels with ports of at least one network switch. The controller monitors interconnections between the patch panels and a network switch that provides access to upstream network devices (i.e., routers, servers, other switches, etc.), and automatically detects the connection of a powered device to the network via a respective telecommunications outlet. The management software is configured to automatically identify a network switch port connected to the telecommunications outlet, apply an energy management policy assigned to the telecommunications outlet to the network switch port, and turn Power over Ethernet (PoE) on and off at a corresponding network switch port according to the energy management policy assigned to the telecommunications outlet.

In some embodiments of the present invention, an automated infrastructure management system communicates with access card readers connected to a network and located at facility access points. The management software is configured to detect an access card read by the card reader and determine that a person associated with the access card is entering the facility. The management software then identifies a physical location within the facility utilized by the person, identifies a network switch port connected to the physical location, and turns PoE on for the identified network switch port.

Similarly, the management software is capable of determining that a person associated with the access card is leaving the facility. The management software then identifies a physical location within the facility utilized by the person, identifies a network switch port connected to the physical location, and turns PoE off for the identified network switch port.

In some embodiments of the present invention, an automated infrastructure management system communicates with smart phone detection devices connected to a network and located at facility access points. The management software is configured to detect a smart phone and determine that a person associated with the smart phone is entering the facility. The management software then identifies a physical location within the facility utilized by the person, identifies a network switch port connected to the physical location, and turns PoE on for the identified network switch port.

Similarly, the management software is capable of determining that a person associated with the smart phone is leaving the facility. The management software then identifies a physical location within the facility utilized by the person, identifies a network switch port connected to the physical location, and turns PoE off for the identified network switch port.

According to some embodiments of the present invention, the management software is configured to display a user interface that illustrates each powered device connected to a network in real time. The user interface can be used to define and schedule energy management policies for each telecommunications outlet within a facility.

According to some embodiments of the present invention, a lighting controller is connected to a communications network and is configured to provide power to a plurality of lighting fixtures throughout a facility. The management software of an automated infrastructure management system is configured to identify a lighting controller port connected to each lighting fixture in real time. In addition, the management software is configured to display a user interface that illustrates the physical location of each lighting fixture in real time. The user interface can be used to define, schedule, and apply energy management policies for each lighting fixture in the facility, for example, based on physical location.

Automated infrastructure management systems, according to some embodiments of the present invention, can also be connected via a network to any controller that is used as part of building management systems such as HVAC, Fire Alarms and Safety, Power Management, etc. As such, embodiments of the present invention can be extended to control and management of end points or end devices that are connected to these controllers.

Automated infrastructure management systems, according to embodiments of the present invention, may have numerous advantages over conventional energy management systems including reduced time to troubleshoot alarms associated with facility energy management systems. For example, when a powered device requires attention due to an alarm condition, embodiments of the present invention allow an administrator to quickly locate the device by displaying its location on a floor plan. In addition, since most energy management systems have the ability to monitor power consumption on individual outlets connected to a power distribution unit (PDU) which provides power to individual telecommunications outlets via the network cabling, embodiments of the present invention can provide an energy management system with information about specific physical and virtual servers that are associated with each outlet on a PDU. When a PDU is experiencing an alarm condition, embodiments of the present invention allow the location of a cabinet for that PDU to be displayed on a data center floor plan.

As such, embodiments of the present invention provide "high resolution" real time location information (e.g., building, floor, room, wall jack information for office applications; and building, floor, room, cabinet row, cabinet information for data center environments). Embodiments of the present invention also provide interactive location-based zoom-in capability for displaying energy/port capacity related data.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 3 is a schematic illustration of an "interconnect" topology for a patching system that may be utilized according to some embodiments of the present invention.

FIG. 4 is a schematic illustration of a "cross-connect" topology for a patching system that may be utilized according to some embodiments of the present invention.

FIG. 5 is a schematic illustration of an automated infrastructure management system, according to some embodiments of the present invention.

FIG. 6 is an exemplary table of energy management policies (EMPs) for respective telecommunications outlets illustrated in FIG. 5, according to some embodiments of the present invention.

DETAILED DESCRIPTION

Figure 1:
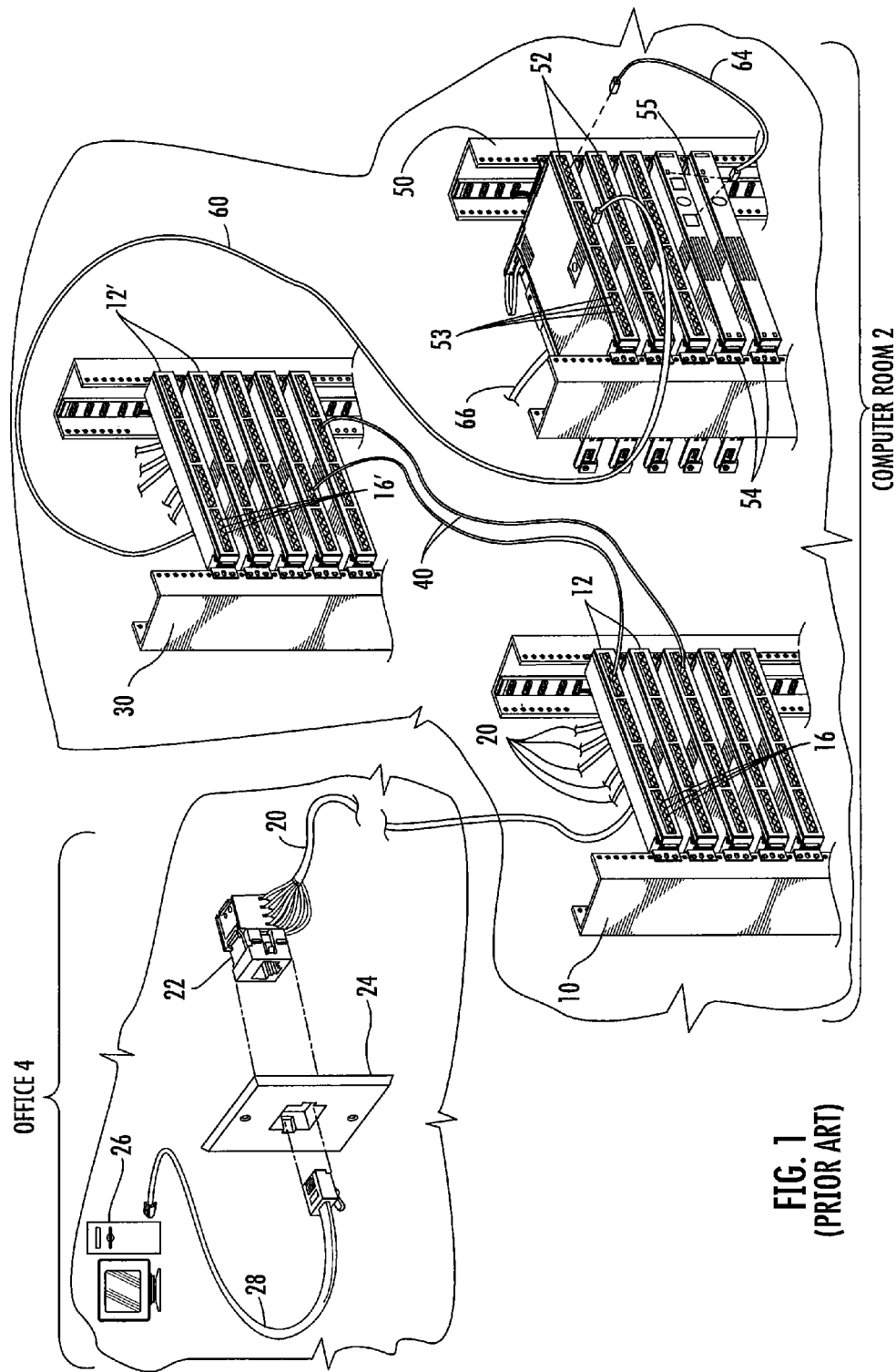
FIG. 1 is a schematic view of a simplified prior art communications patching system.
Figure 2:
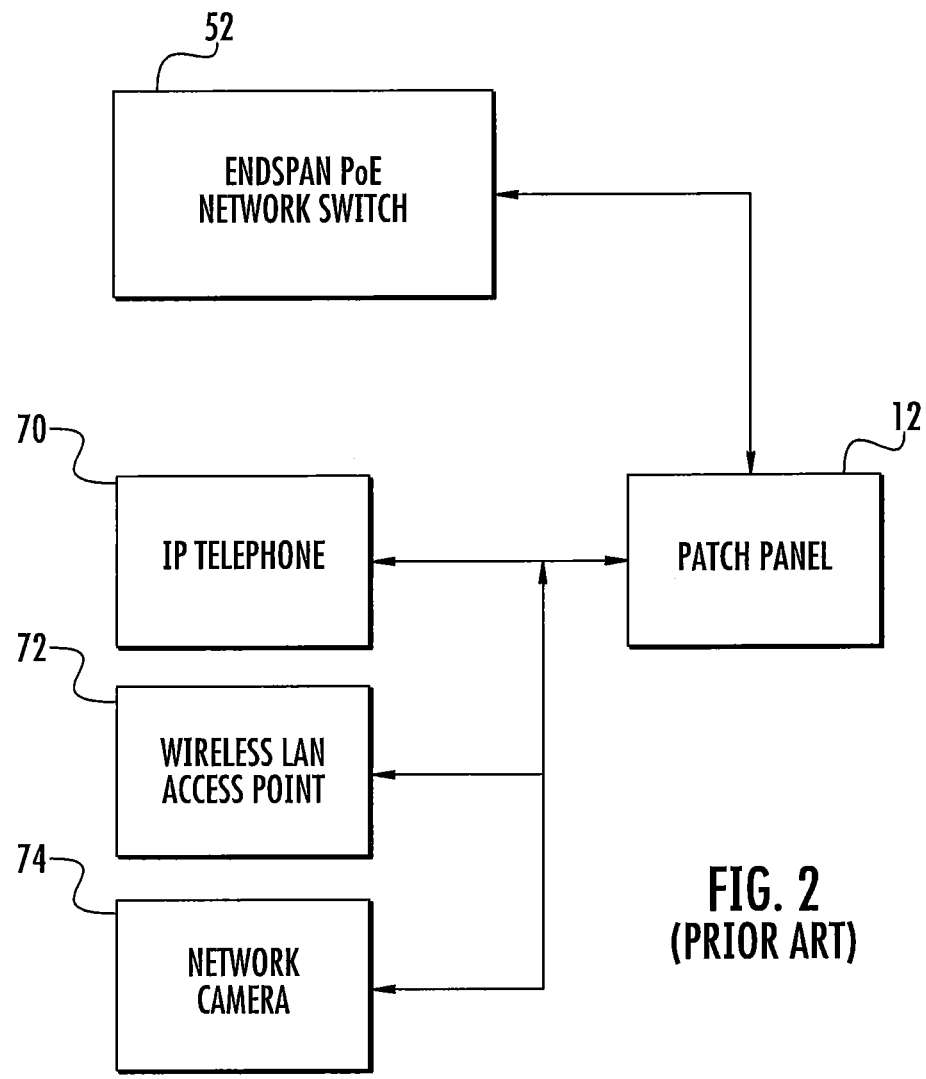
FIG. 2 is a block diagram of a conventional endspan system for providing PoE to powered devices connected to a network.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity. In addition, the sequence of operations (or steps) is not limited to the order presented in the figures and/or claims unless specifically indicated otherwise.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment and/or figures, the features and elements so described or shown can apply to other embodiments and/or figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain and/or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "intelligent patch panel" refers to any communications system patch panel that is configured to sense the insertion and removal of a patch cord in any of its connector ports and that automatically tracks connections. As known to those skilled in the art, intelligent patch panels are typically mounted to a rack that includes a rack manager controller, which may or may not be in the same rack as the patch panels, that communicates with the intelligent patch panels and with other rack manager controllers, if present. Each controller is configured to communicate with a database. The database is configured to store patch cord connectivity information between, for example, patch panel ports and/or patch panel ports and switch ports. The database may also be configured to store connectivity information between telecommunications outlets and patch panel ports. An exemplary intelligent patch panel system is the SYSTIMAX® iPatch® system (CommScope, Inc., Hickory, N.C.), which has the ability to automatically detect changes to patch cord connectivity and to identify and track, in real time, the physical location of devices connected to a network (also referred to as endpoint devices).

The term "management software", as used herein, refers to software that executes on one or more processors for performing the various functions of embodiments of the present invention described herein. For example, management software, when executed on one or more processors, is configured to, among other things, apply an energy management policy to a respective communication channel, provide real time physical location information for the communication channels to a network switch, and provide real time physical location information for the communication channels to external applications for energy management.

The terms "network switch" and "switch", as used herein, are interchangeable and refer to a device in a telecommunications network that channels incoming data from any of multiple input ports to the specific output port that will take the data toward its intended destination (e.g., upstream network devices, such as routers, servers, other switches, etc.). For example, on an Ethernet local area network (LAN), a switch determines from the physical device address (e.g., Media Access Control or MAC address) in each incoming data frame which output port to forward the data frame to and out of. In a wide area packet-switched network such as the Internet, a switch determines from the IP address in each data packet which output port to use for the next part of its trip to the intended destination.

The terms "communication channel" and "communication circuit", as used herein, are interchangeable and refer to the physical path from a switch port to a telecommunications outlet.

Types of network patching systems in which various embodiments of the present invention may be implemented are illustrated in FIGS. 3 and 4. FIG. 3 illustrates an "interconnect" topology and FIG. 4 illustrates a "cross-connect" topology. As understood by those skilled in the art of the present invention, in office buildings (and other types of facilities), network switch ports are connected to wall jacks in work areas via a cabling circuit that typically consists of a horizontal cable between a patch panel and telecommunications outlet (e.g., a wall jack, etc.) and a patch cord connection between a patch panel port and a switch port. In the interconnect topology of FIG. 3, a network switch 52 is connected to a patch panel 12 via a patch cord 40. The patch panel 12 is connected to a plurality of wall jacks 22a, 22b, 22c in a work area via horizontal cabling 20 (only one horizontal cable 20 is illustrated to simplify the drawing).

In a cross-connect topology (FIG. 4), network switch ports are mirrored on patch panel connector ports, and a patch cord connection is made between two patch panel connector ports. Thus, as illustrated in FIG. 4, a network switch 52 is connected to a first patch panel 12a via a patch cord 40. The first patch panel 12a is connected to a second patch panel 12b via another patch cord 40. The second patch panel 12b is connected to a plurality of telecommunications outlets, such as wall jacks 22a, 22b, 22c, in a work area via horizontal cabling 20 (only one horizontal cable 20 is illustrated to simplify the drawing).

The term "powered device" refers to any endpoint device connected to a network that receives electrical power via the network including, but not limited to PoE devices, personal computers, copiers, printers, and other devices that can receive power via the network, including devices connected to the network via a daisy chain through a PoE device.

The terms "energy management policy" and "power management policy", as used herein, are interchangeable and refer to rules regarding the following for each powered device in a network: the time(s) of day that power is available to a powered device, the amount of power allocated to a powered device, etc.

The term "Simple Network Management Protocol" (SNMP) is the protocol governing network management and the monitoring of network devices and their functions. SNMP is described formally in the Internet Engineering Task Force (IETF) Request for Comment (RFC) 1157.

An exemplary energy management system that can be utilized with an automated infrastructure management system, according to embodiments of the present invention includes, but is not limited to, the EnergyWise® system from Cisco Systems, Inc. (San Jose, Calif.). The EnergyWise® system is an energy management system that measures power consumption and optimizes power usage in facilities. Endpoint devices that obtain their power from network switches via PoE, such as wireless LAN access points (AP), IP phones, ethernet/IP-based video surveillance cameras, etc., can be monitored and controlled via the EnergyWise® system. The EnergyWise® system supports manually defined domain parameters to group devices based on their location. However, embodiments of the present invention can be used with any energy management system, as well as other third party applications/systems.

Applicants have discovered that using real time mapping information between switch ports and physical locations of telecommunications outlets obtained via an automated infrastructure management system provides an efficient and effective way to apply energy management policies (EMPs) to powered devices (e.g., PoE devices). The provisioning of PoE services via an automated infrastructure management system, according to embodiments of the present invention, is advantageous for numerous reasons including, but not limited to, improved energy conservation, improved network security, cost reductions in facility management, and the elimination of having to manually define domains and group powered devices in domains as required by conventional energy management systems. In addition, embodiments of the present invention can be used to manage a variety of systems such as lighting systems, PDUs, heating and cooling systems, mechanized curtains, external blinds on windows, electrical power outlets, etc.

An automated infrastructure management system, according to embodiments of the present invention, pre-populates domains for each switch port/interface with location information that is based on connectivity data tracked by intelligent patch panels. Since the automated infrastructure management system is constantly monitoring physical connectivity, a domain field for each switch port is automatically updated when location information is changed due to connectivity changes. According to embodiments of the present invention, an energy management system is "synchronized" with an automated infrastructure management system to pre-populate all location information for a particular managed facility so that it can be used to define and implement energy management policies. This approach allows for centralizing control of power usage at a network switch in the communications network rather than through the configuration of end devices. Only switch ports that have location information are subjected to EMPs. In some embodiments of the present invention, by default, network switch ports that are not connected to any work areas (meaning that they do not have location information) will not be enabled with PoE.

According to embodiments of the present invention, an automated infrastructure management system provides the capability for real time mapping of switch ports to the physical locations of wall outlets and network devices. This is achieved through a combination of data cabling information that is gathered from hardware (e.g., switches, routers, servers, computers, etc.) and SNMP data which is collected from the network switches. An automated infrastructure management system, according to embodiments of the present invention, may have complete visibility of every physical location of a facility/location that is connected to each switch port.

An exemplary automated infrastructure management system 100, according to embodiments of the present invention, is illustrated in FIG. 5. The automated infrastructure management system 100 includes racks of intelligent patch panels 12, a controller 14 associated with each patch panel rack, and a management server 102 that hosts and executes management software. The management software collects connectivity data from the patch panels 12 and controllers 14. For example, when patch panel port connections change, a controller 14 associated with the respective patch panel sends information about the change to the management software so the management software can update connectivity information (i.e., the physical circuit between a network switch port and a telecommunications outlet) maintained within a database for the network. Thus, the automated infrastructure management system 100 detects physical circuit changes and automatically updates connectivity information in real time, and can properly apply an EMP to a correct switch port for a respective telecommunications outlet in real time. The management software can reside within and/or be executed on more than one device, as would be understood by one skilled in the art. Embodiments of the present invention are not limited to a single device, such as the management server 102 of FIG. 5 for hosting and executing the management software that performs the various functions described herein.

Embodiments of the present invention allow each physical location in a facility to have a different EMP. For example, one EMP may specify that all PoE supported IP phones are turned off at 6 pm every day of the week and then turned back on at 8 am. To accomplish this, and as described in detail below, an automated infrastructure management system (100, FIG. 5) runs, via the management software, a query at 6 pm to identify each network switch port that is connected to a physical location which is covered by a specific EMP. The same process occurs at 8 am in order to turn the PoE back on. Embodiments of the present invention also provide the ability to turn PoE on or off as a result of completion of patching activity. For example, if a patch connection is added (i.e., a patch cord is added to create a communication circuit), then PoE would be turned on for the particular circuit. When the patch connection is removed (i.e., a patch cord is removed to disable a communications circuit), PoE could be turned off for that circuit, thus providing a dynamic way to manage energy consumption. Embodiments of the present invention also provide the ability to turn PoE on or off when the port link status of a network switch port changes. As will be described below, embodiments of the present invention also provide the ability to manage LED lights in a facility that is using IP-based lighting controllers. Embodiments of the present invention also provide the ability to control the availability of a WiFi network by turning power on and off to a WiFi access device. In addition, embodiments of the present invention provide the ability to manage any system or device connected via a network to a controller including, but not limited to, HVAC systems, fire alarm systems and other types of safety systems, electrical devices and electrical outlets.

FIG. 6 is a table that shows exemplary EMPs for the various powered devices connected to the automated infrastructure management system 100 illustrated in FIG. 5. In Office 01, an employee phone is connected to wall jack 1B and the following EMP has been applied thereto: Monday through Friday power is on at 6:00 am and off at 8:00 pm; power is off on the weekends. In Office 02, an employee phone is connected to wall jack 1B and the following EMP has been applied thereto: Monday through Friday power is on at 6:00 am and off at 8:00 pm; power is off on the weekends. In the Executive Office, an executive phone is connected to wall jack 1B and the following EMP has been applied thereto: power is off on the weekends only. In the Lobby, a security camera is connected to wall jack 1B and the following EMP has been applied thereto: power is always on. In the Lobby, a security phone is connected to wall jack 2B and the following EMP has been applied thereto: power is always on. In the Lobby, a public web access point is connected to wall jack 3A and the following EMP has been applied thereto: Monday through Friday power is on at 6:00 am and off at 8:00 pm; power is off on the weekends. In the Meeting Room, a speaker phone is connected to wall jack 1B and the following EMP has been applied thereto: power is on demand based on meeting schedule. In the Meeting Room, a private web access point is connected to wall jack 2B and the following EMP has been applied thereto: power is on demand based on meeting schedule.

Figure 7:
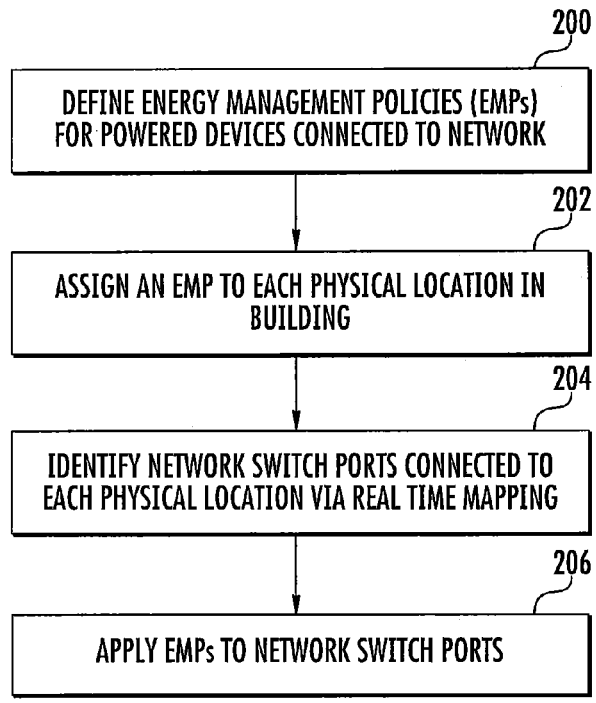
FIGS. 7-11 are flow diagrams illustrating operations for implementing various embodiments of the present invention.

FIGS. 7-11 are flow diagrams illustrating operations performed by the management software of the automated infrastructure management system 100 of FIG. 5 for implementing various embodiments of the present invention. Referring initially to FIG. 7, operations for applying PoE control to powered devices in a network, according to some embodiments of the present invention, are illustrated. Initially, one or more EMPs are defined for powered devices connected to the network (Block 200). An EMP is then assigned to each physical location in a facility (Block 202). Physical locations in a facility include, but are not limited to, offices, conference rooms, auditoriums, laboratories, lobbies, manufacturing areas, etc. Next, network switch ports connected to each physical location are identified via real time mapping performed by an automated infrastructure management system (e.g., 100, FIG. 5) (Block 204). As described above, real time mapping may be achieved through data cabling information gathered from intelligent patch panels (12, FIG. 5), through SNMP data collected from network switches (52, FIG. 5), or through a combination thereof. As such, an automated infrastructure management system (100, FIG. 5) may have complete visibility of every physical location in a facility that is connected to a network switch port. The defined EMPs are then applied to the respective network switch ports associated with the physical locations (Block 206).

Figure 8:
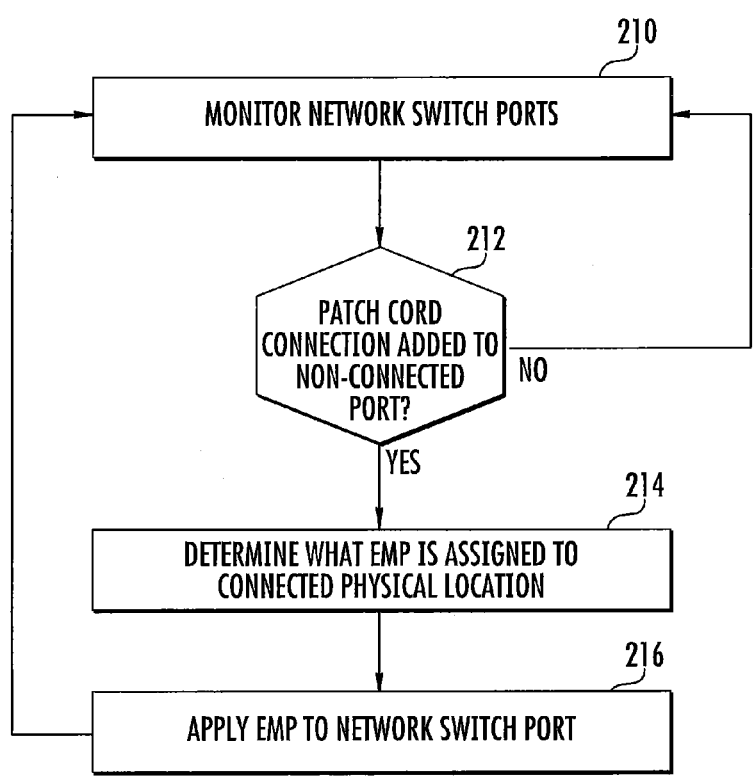

Referring now to FIG. 8, operations for dynamic energy management of powered devices, according to some embodiments of the present invention, are illustrated. The connectivity status of ports of a network switch 52 within an intelligent infrastructure system 100 (FIG. 5) are monitored (Block 210). Whenever cabling information changes, the automated infrastructure management system detects the change and updates cabling information maintained by the management software. By knowing real time physical locations that are supported by switch ports, various EMPs can be applied to powered devices when they are connected to the network. For example, if a patch cord connection is detected as being added to a previously non-connected network switch port (Block 212), a determination is made as to what EMP is assigned to the physical location connected to the network switch port (Block 214). The EMP is then applied to the recently-connected network switch port (Block 216).

An automated infrastructure management system, according to embodiments of the present invention, can also be used in combination with card readers and other facility access ports to achieve dynamic, location-based power management capabilities. For example, when a person enters a facility, he/she uses a card reader to read an access card/badge in order to gain access to the facility. According to some embodiments of the present invention, the card reader sends the person's name to the automated infrastructure management system 100. Using the person's name, the automated infrastructure management system 100 determines the office location of the person along with network connections that are used by that person. If any of the network connections support PoE, then the automated infrastructure management system 100 communicates to a specific switch port via an energy management system in order to turn on PoE services for that person. When the person uses a card reader to exit the facility, the automated infrastructure management system 100 detects that the person has left the facility and communicates to the network switch to turn off PoE for the switch port(s) in use by that person. These operations are illustrated in FIG. 9.

Figure 9:
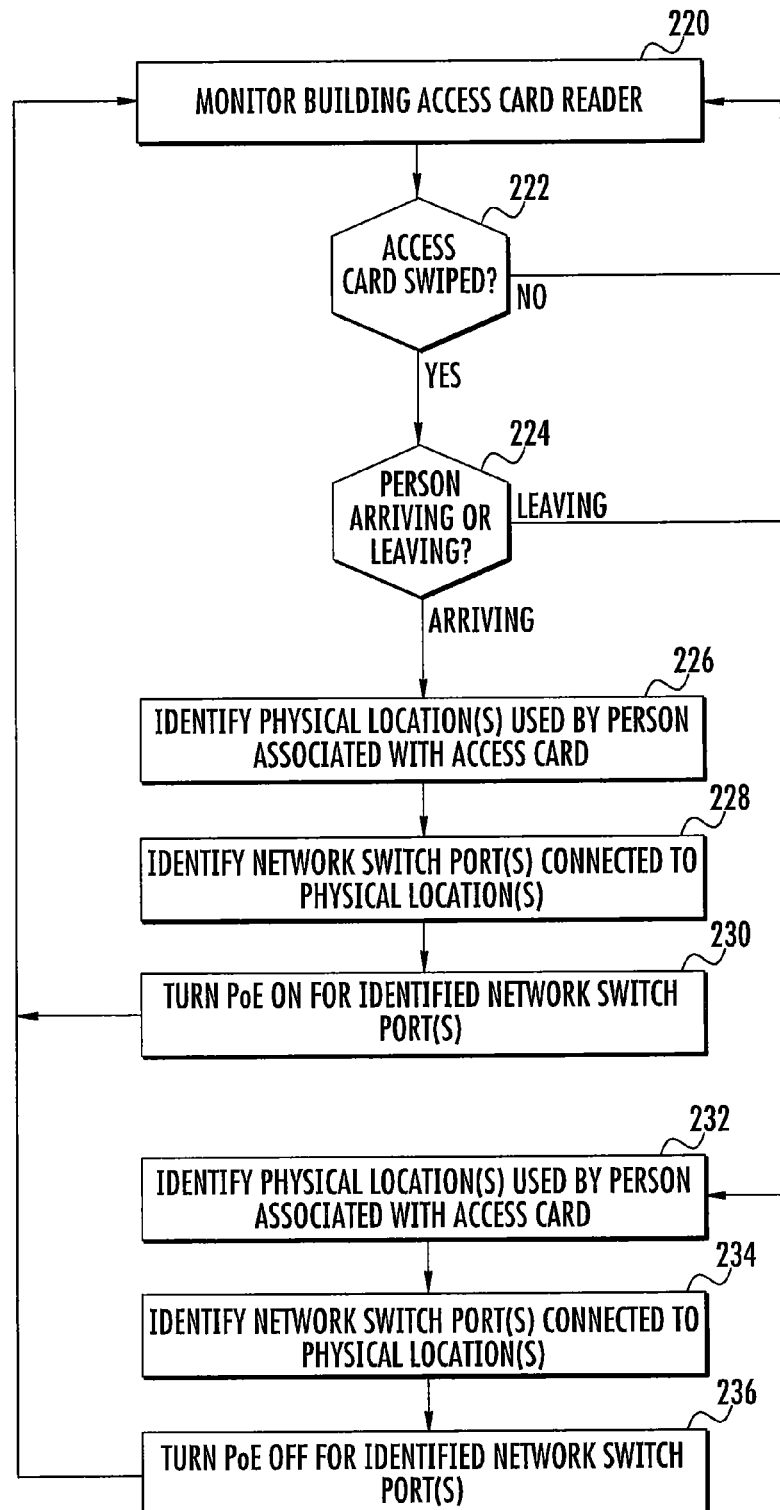

Referring to FIG. 9, an automated infrastructure management system (100, FIG. 5) may be configured to monitor facility access card readers and/or other devices capable of detecting a person's smart phone or other electronic device that are proximate a facility access location (Block 220). The term "smart phone", as used herein, refers to a cellular telephone with an integrated computer and other features, such as an operating system, Web browsing and the ability to run software applications. The term "smart phone", as used herein, also refers to any type of electronic device that can be detected and that can identify a person associated with the electronic device. Exemplary devices that can be detected and that are referred to herein as smart phones include, but are not limited to, the iPhone®, iPod®, iPad®, and other mobile devices running the Apple® iOS operating system; devices running the Google® Android® operating system; devices running the Microsoft® Windows Mobile® operating system; devices running the Windows Phone® operating system; devices running the Nokia® Symbian® operating system; and devices running the RIM® BlackBerry® operating system. Devices capable of detecting RF signals and/or other types of electronic signals from electronic devices are well know and need not be described further herein.

Continuing with FIG. 9, if an access card is swiped or otherwise detected at a card reader and/or a smart phone is detected (Block 222), the automated infrastructure management system determines if the person is entering the facility or leaving the facility (Block 224). For example, the automated infrastructure management system (100, FIG. 5) determines if PoE is currently on or off for devices associated with the particular person as one factor in determining if the person is entering or leaving the facility. The determination of whether the person is entering or leaving the facility can also be made based on physical location of a card reader. For example, if a card reader or other detection device is located outside of a facility, the person is most probably entering the facility and if the card reader or other detection device is located inside a facility, the person is most probably leaving the facility. If the person is entering the facility, the physical location(s) used by the person associated with the swiped access card and/or smart phone are identified (Block 226). Next, network switch ports connected to each physical location used by the person are identified (Block 228). PoE is then turned on for the identified network switch ports such that devices at the physical locations become powered (Block 230).

If the person is leaving the facility, the physical location(s) used by the person associated with the swiped access card and/or smart phone are identified (Block 232). Next, network switch ports connected to each physical location used by the person are identified (Block 234). PoE is then turned off for the identified network switch ports such that devices at the physical locations are no longer powered (Block 236).

Embodiments of the present invention may also be utilized for card readers and other detection devices located within a facility, such as for access to particular areas of a facility.

Figure 10:
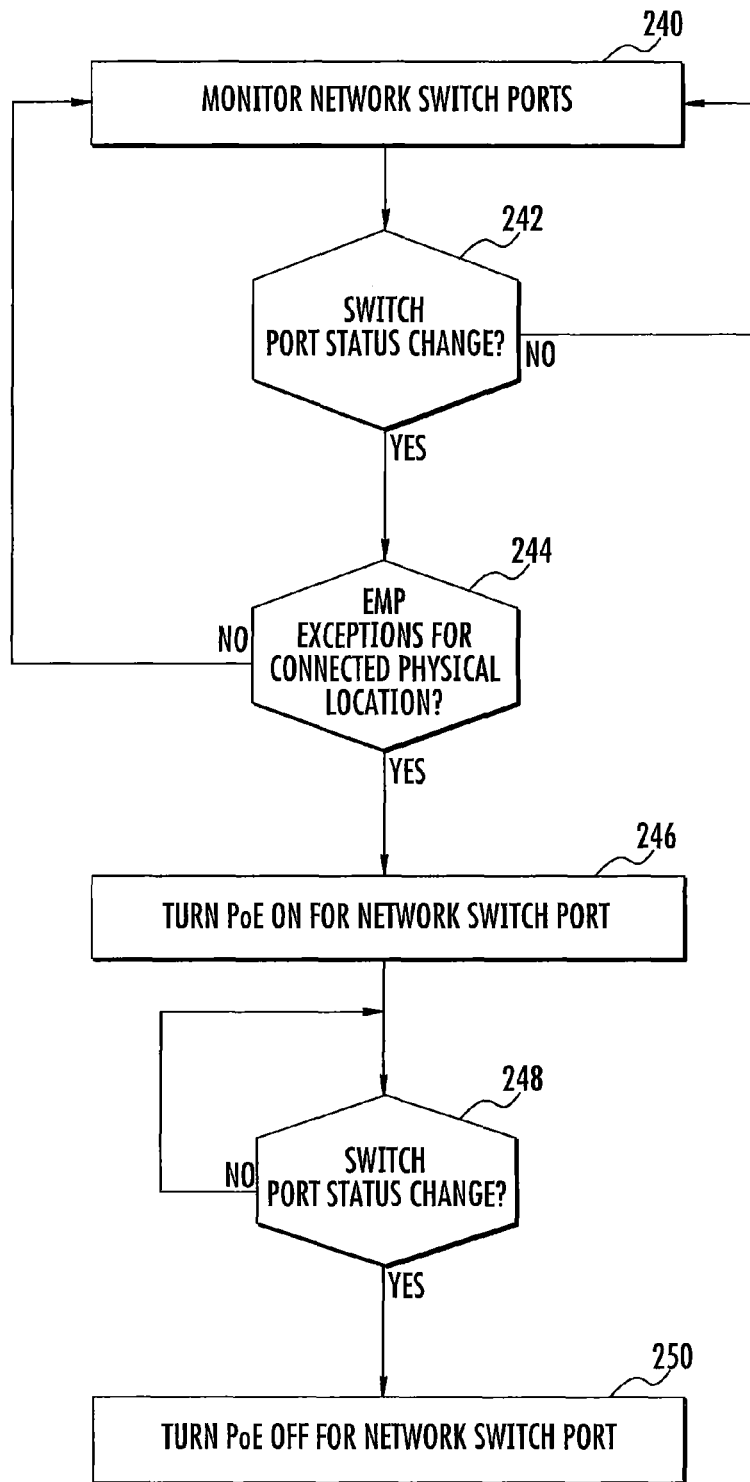
Figure 11:
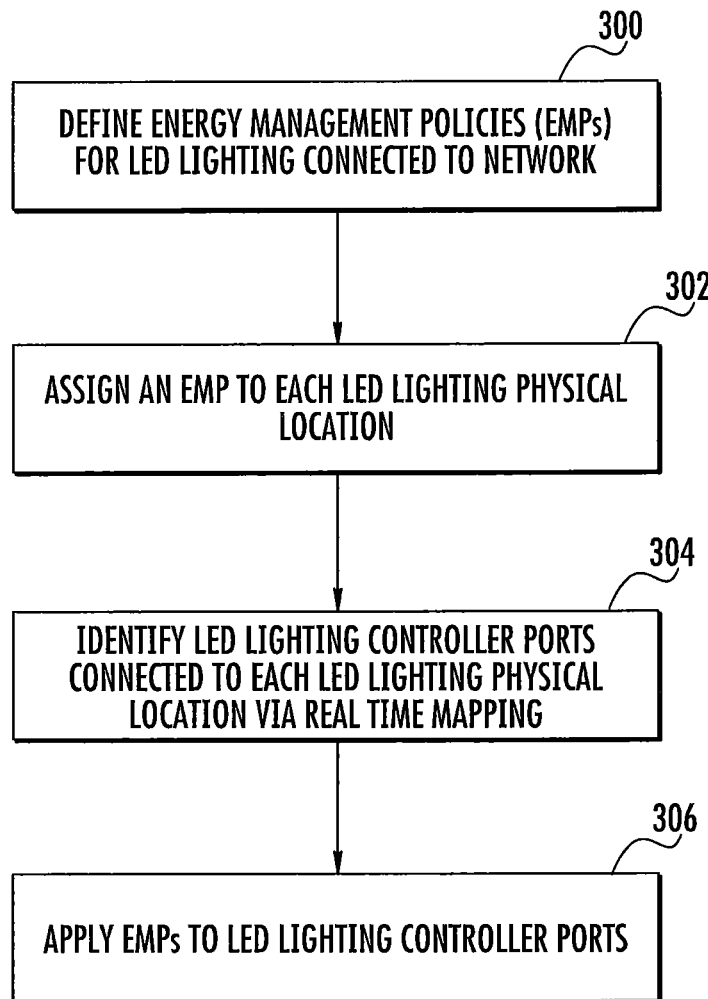

Referring to FIG. 10, operations for dynamic energy management of powered devices, according to other embodiments of the present invention, are illustrated. The connectivity status of ports of a network switch 30 within an automated infrastructure management system 100 (FIG. 5) are constantly monitored (Block 240). In the illustrated embodiment, the monitored network switch ports are not active (i.e., link is down) and the current EMP for each switch port is "PoE is off." If the automated infrastructure management system 100 detects a change in the connectivity status of a switch port (Block 242), a determination is made whether there are any EMP exceptions for the connected physical location(s) (Block 244). In other words, if an existing EMP for the physical location allows PoE to be turned on when a device is detected as being connected to the network, then PoE is turned on for the switch port (Block 246). If there is not an EMP exception, PoE is not turned on for the physical location(s) and the system returns to monitoring the connectivity status of ports of the network switch (Block 240). The automated infrastructure management system 100 monitors the network switch port for which the PoE was turned on and, if a change is detected in the network switch port (i.e., link down) (Block 248), then PoE is turned off for the network switch port (Block 250).

Management software for an automated infrastructure management system 100, according to embodiments of the present invention, may have many additional functions. For example, the management software can be configured to provide real time physical location information for devices connected to the communication channels to a management information base (MIB) for a network switch. As would be understood by those skilled in the art, MIBs describe the structure of the management data of a device subsystem, and use a hierarchical namespace containing object identifiers (OID). Each OID identifies a variable that can be read or set via SNMP The management software can be configured to apply "Wake on Lan" (WoL) commands to a device (e.g., desktop computer, laptop computer, etc.) connected via a daisy chain to a PoE device (e.g., an IP phone, WiFi Access Point, etc.). As would be understood by one skilled in the art of the present invention, WoL is an Ethernet computer networking standard that allows a computer or other device to be turned on or woken up by a network message.

Computers can be connected to a network through IP phones. This arrangement sometimes is referred to as a daisy chain connection. However, access to the network is only enabled while an IP phone is powered on. This means that for organizations that have implemented EMPs, access to the network via a daisy chain connection may not be available during off-hours. Many IT departments are using off-hours to conduct computer maintenance work which requires remote access to a computer via a network. The management software, according to some embodiments of the present invention, maintains a database of all devices and their physical locations within a facility. As such, the management software can determine if a specific device (e.g., a computer) is daisy chained via an IP phone to the network. When this is the case, the management software can identify a physical location for that computer and a corresponding switch port in order to override the existing EMP and enable PoE to the IP phone. The management software then sends a WoL command to turn on the computer. In addition, the management software is configured to apply Power Off commands for the computer at a time when Power Off needs to be enforced.

The management software is also configured to correlate physical locations of endpoint devices (e.g., desktop computers, laptop computers, etc.) with PoE devices for the purpose of applying an exception to an EMP when SNMP Link Up/Link down traps are generated by a network switch. Sometimes, instead of a daisy chain connection between an IP phone and a computer, these devices are connected to two different telecommunications outlets. In this arrangement, if a person comes to an office after work hours, the management software can override an EMP in order to provide power to the IP phone for the duration of afterhours work. When the person's computer is detected on the network, the management software would receive an SNMP Link Up trap. In turn, the management software would determine the physical location of this computer, and would also identify an IP phone which supports this location (e.g., an IP phone which is assigned to the person who is using the computer) along with its corresponding telecommunications outlet. Then PoE could be turned on a switch port which is connected to that telecommunications outlet. Once the person disconnects the computer from the network (e.g., by logging off or shutting down the computer), a switch would send SNMP Link Down trap, and then the management software would turn off PoE on the previously enabled switch port.

In addition to powered devices connected to a communications network, lighting devices, such as light emitting diodes (LEDs), can be powered via PoE and, thus, can be monitored and controlled via an automated infrastructure management system, according to some embodiments of the present invention. An LED is a semiconductor device which converts electricity into light. LEDs are increasingly being utilized in commercial applications, such as office lighting. For example, Redwood Systems (Fremont, Calif.) has developed network switches that supply power and networking over a single cable specifically for LED lighting systems.

Automated infrastructure management systems, according to embodiments of the present invention, can be combined with LED network switches to provide dynamic energy management capabilities. For example, referring to FIG. 11, operations for dynamic energy management of lighting associated with a facility, according to some embodiments of the present invention, are illustrated. Initially, one or more EMPs are defined for lighting devices, such as LED lighting devices, connected to a network (Block 300). An EMP is then assigned to each lighting device physical location (Block 302). As described above, physical locations include, but are not limited to, offices, conference rooms, lobbies, etc. Next, lighting controller ports connected to each lighting device physical location are identified via real time mapping (Block 304). Real time mapping is achieved through data cabling information gathered from intelligent patch panels (12, FIG. 5), through SNMP data collected from network switches (52, FIG. 5), or through a combination thereof. As such, an automated infrastructure management system (100, FIG. 5) has complete visibility of every lighting device physical location in a facility that is connected to a switch port. The defined EMPs are then applied to the respective lighting device controller ports (Block 306).

Referring now to FIGS. 12A-12G, a user interface 400 for assigning EMPs to physical locations within a facility, according to some embodiments of the present invention, is illustrated. The illustrated user interface 400 includes a window 402 that is utilized to select physical locations (building/floor/room, etc.) within a facility. The illustrated user interface 400 also includes a window 404 (FIG. 12B) that graphically displays rooms within a facility from a facility layout. Window 404 is displayed, for example, upon user activation of GUI control 403. A user can select rooms and telecommunications outlets within a facility by either selecting a room description in window 402 or selecting the graphical representation of a room in window 404. The illustrated user interface 400 also includes a window 406 (FIG. 12A) for use in defining and scheduling EMPs for physical locations within a facility. Windows 402, 404, 406 and various other GUI controls within user interface 400 will now be described.

Figure 12A:
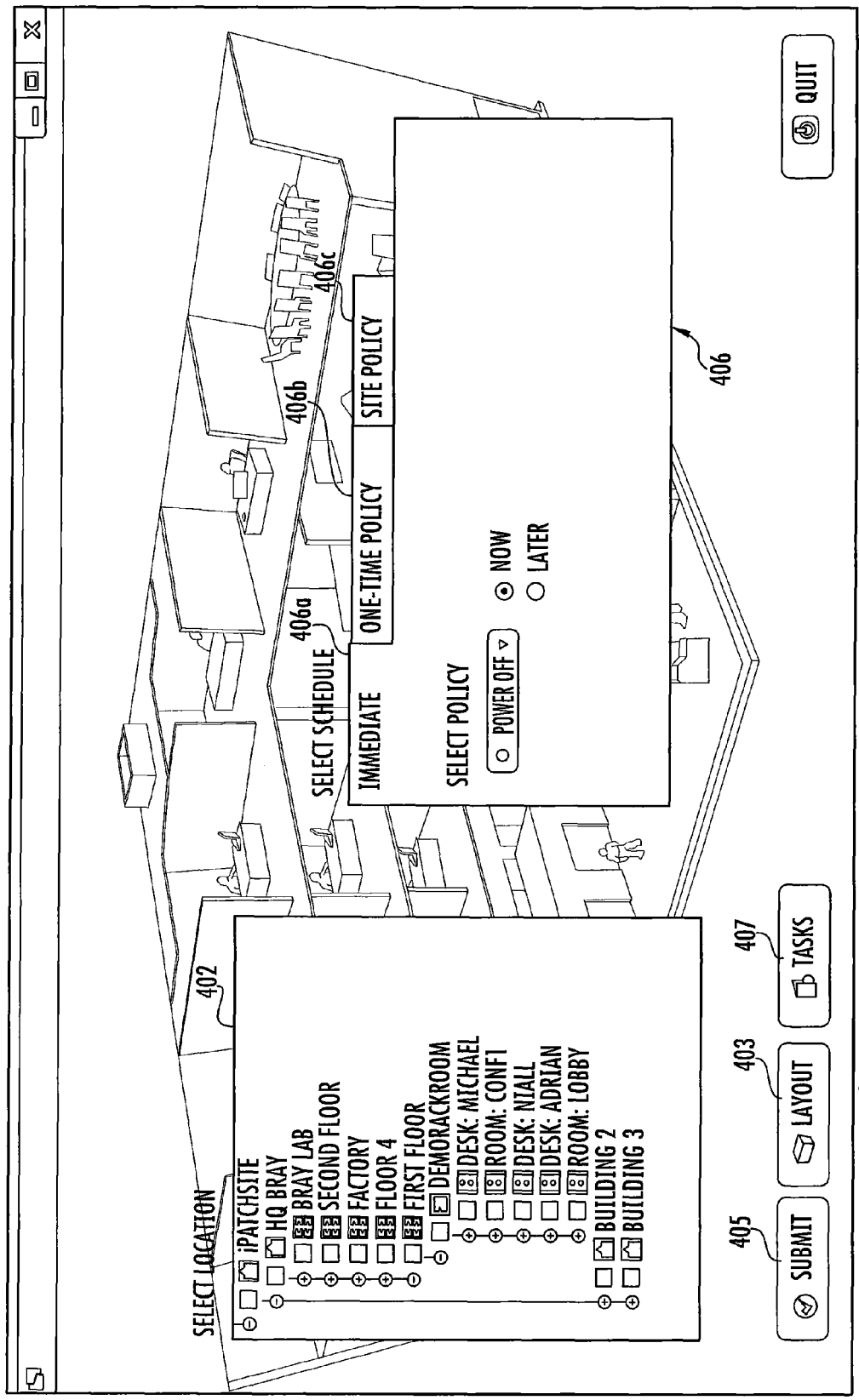
FIGS. 12A-12G illustrate user interfaces that may be utilized in accordance with various embodiments of the present invention.
Figure 12B:
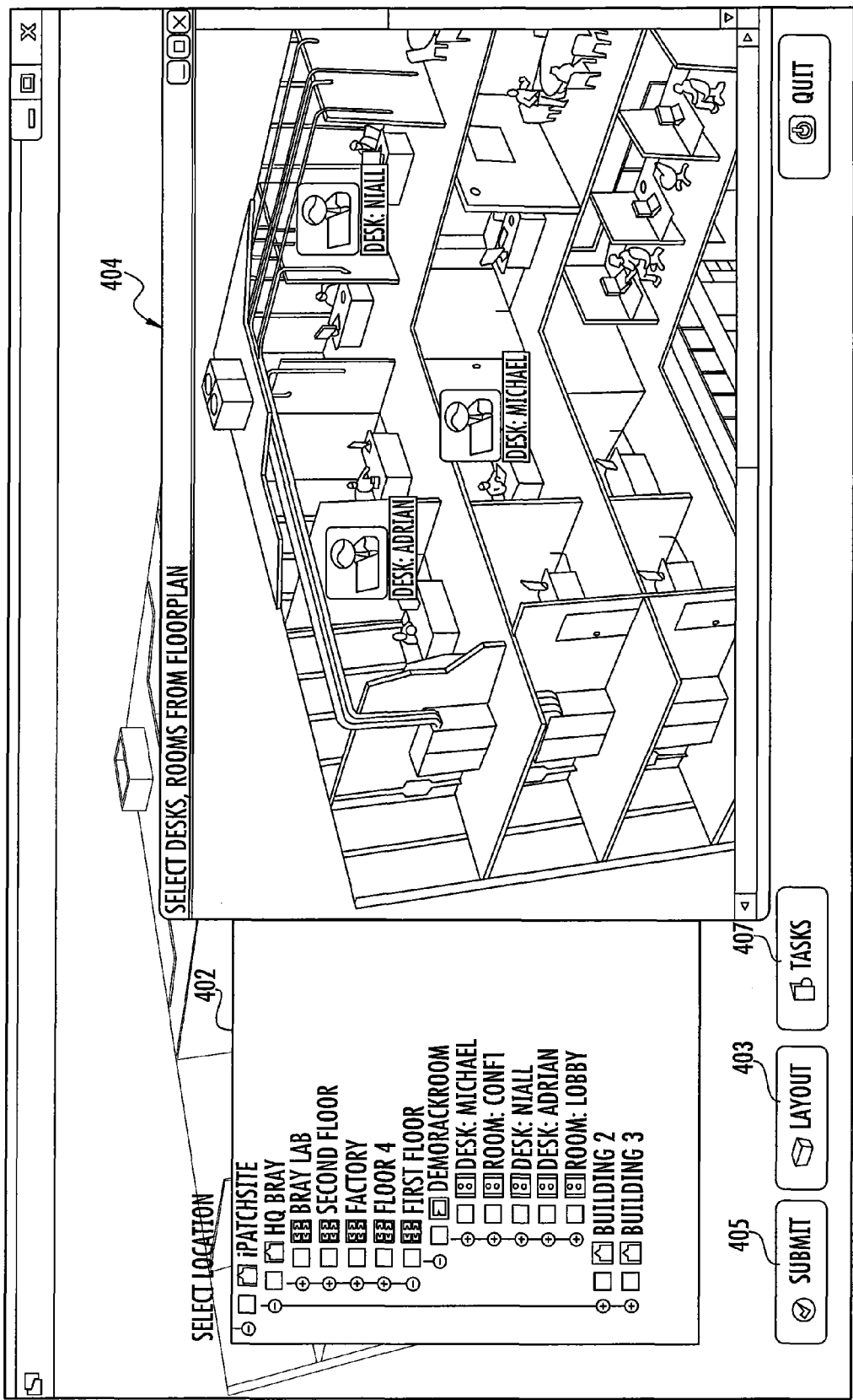
Figure 12C:
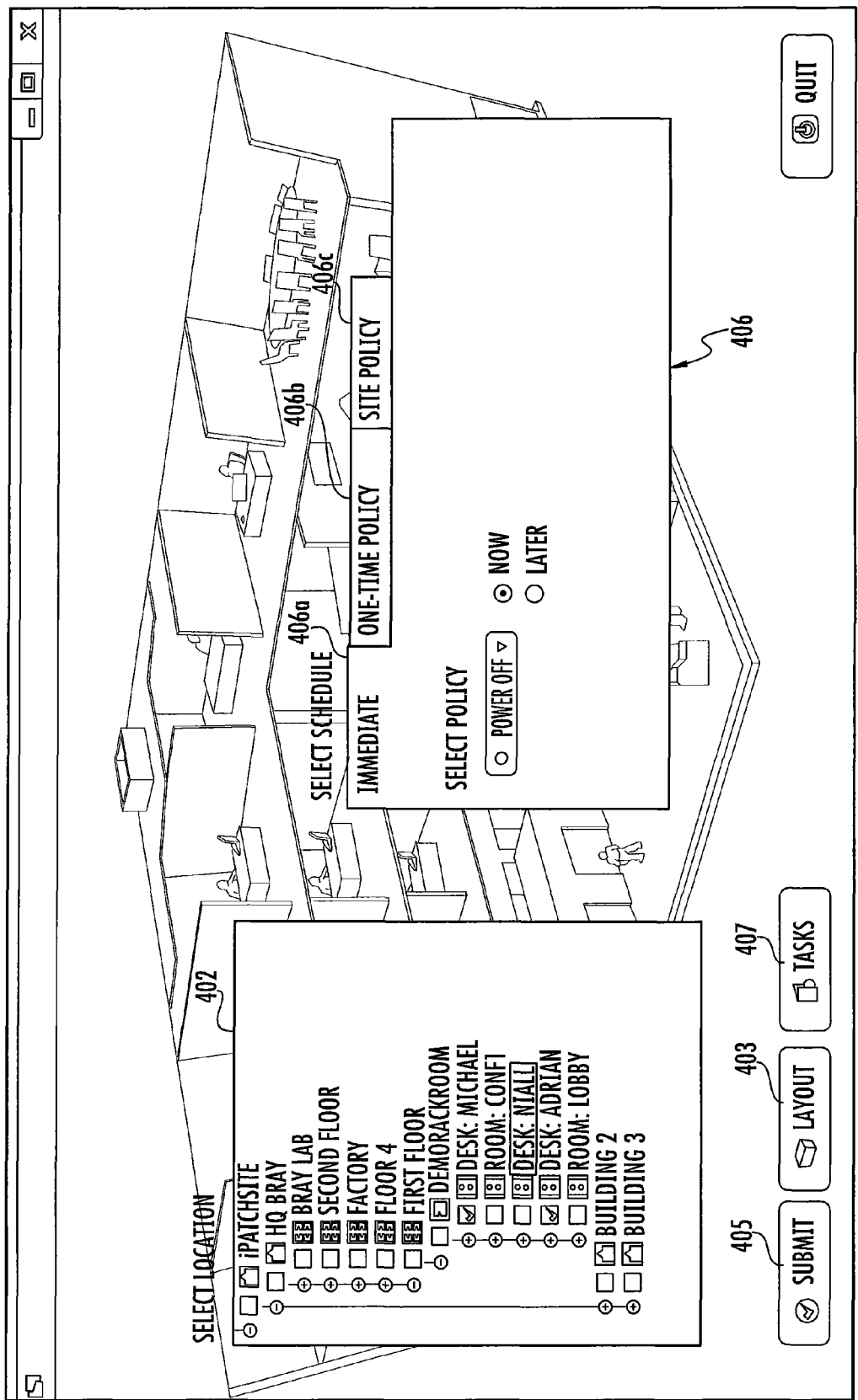
Figure 12D:
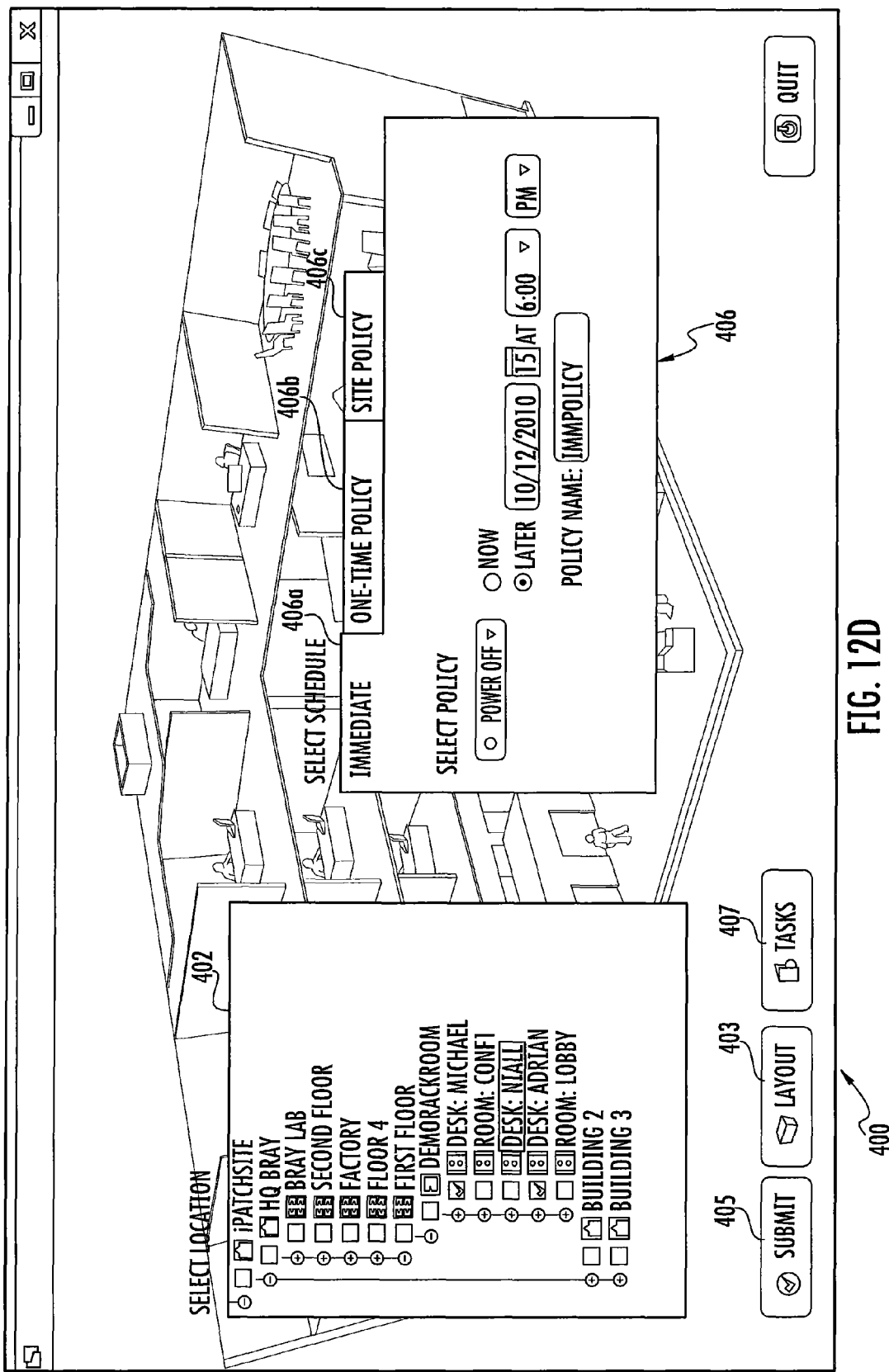
Figure 12E:
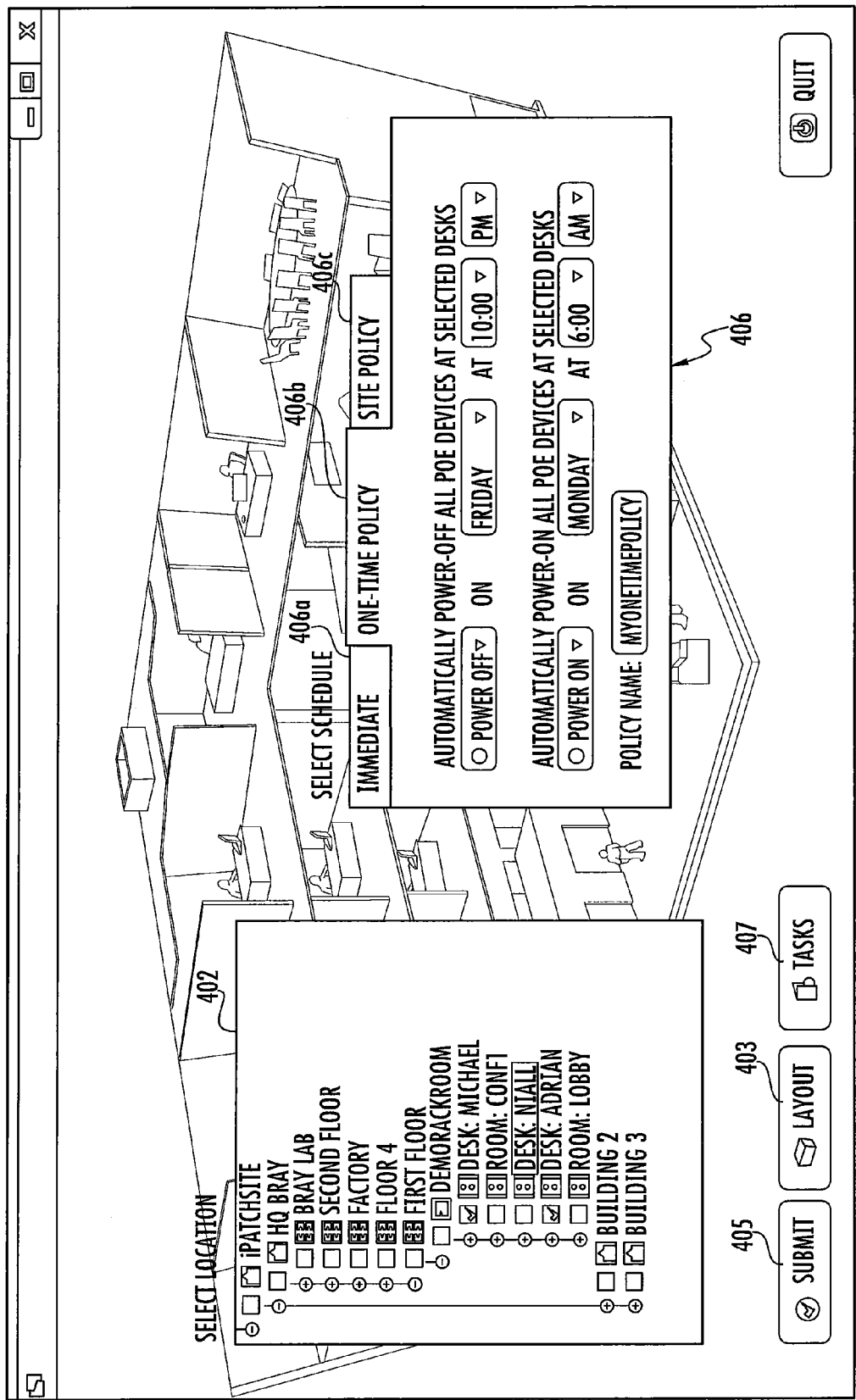
Figure 12F:
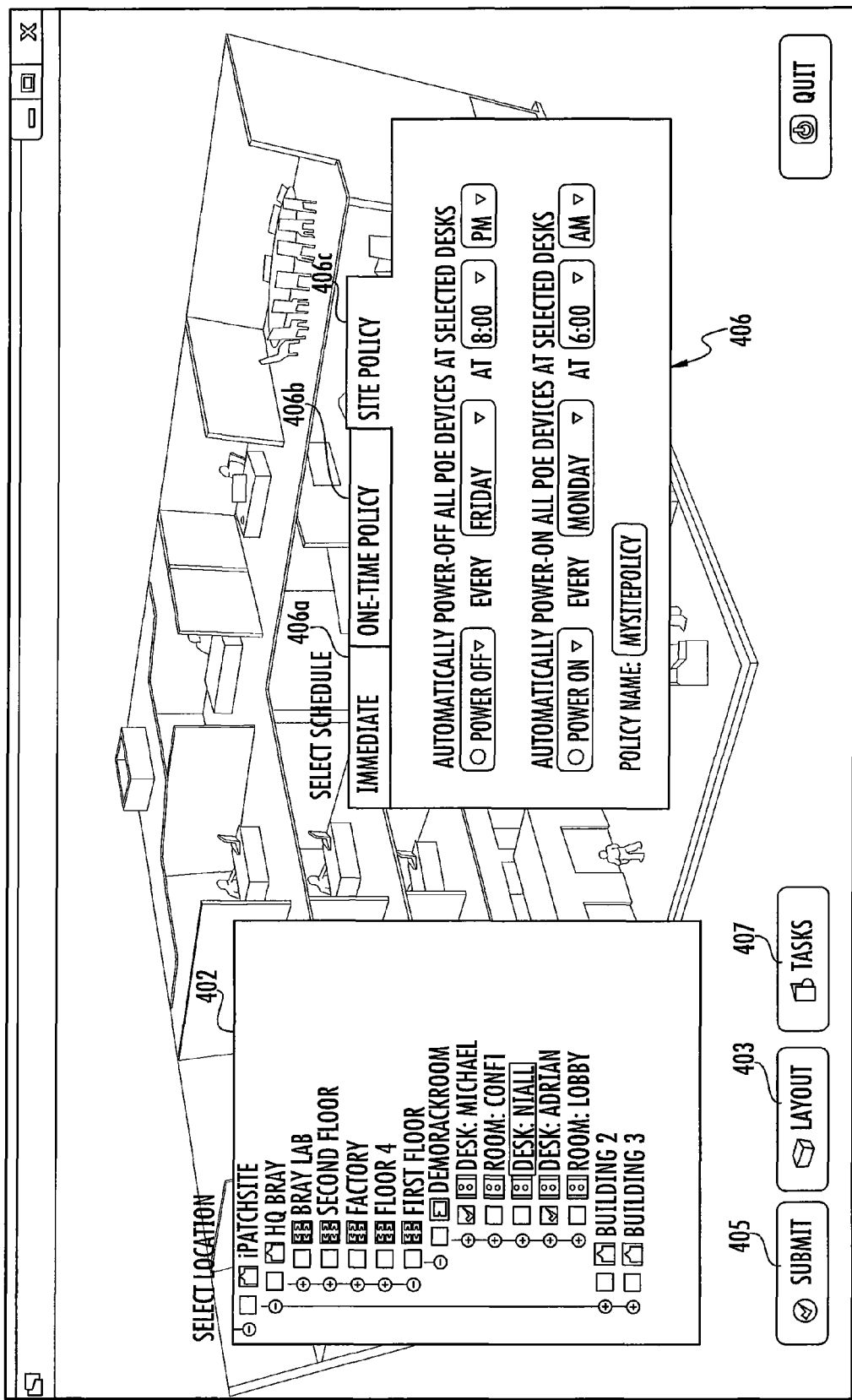

Referring to FIG. 12C, a user has selected, via window 402, rooms in the facility occupied by Michael and Adrian. The user, via window 406, can assign an immediate EMP, a one-time EMP, and a site EMP to the wall jacks in the selected rooms via tabs 406a, 406b and 406c, respectively. For example, in FIG. 12D, the user has defined an immediate EMP "immpolicy" within tab 406a. This EMP sets PoE to "on" on Oct. 12, 2010 at 6:00 pm. In FIG. 12E, the user has defined a one-time EMP "myonetimepolicy" within tab 406b. This EMP automatically powers off all PoE devices at the selected wall jacks (i.e., the wall jacks in the rooms occupied by Michael and Adrian) on the next Friday at 10:00 pm and turns the power back on for these wall jacks on the following Monday at 6:00 am. In FIG. 12F, the user has defined a site EMP "mysitepolicy" within tab 406c. This EMP automatically powers off all PoE devices at the selected wall jacks (i.e., the wall jacks in the rooms occupied by Michael and Adrian) on Fridays at 8:00 pm and turns the power back on for these wall jacks on Mondays at 6:00 am.

EMPs, may also turn PoE on/off for various other devices in the location of selected wall jacks. For example, printers and copiers connected to a network can also be turned on/off according to an EMP that affects particular network users.

Figure 12G:
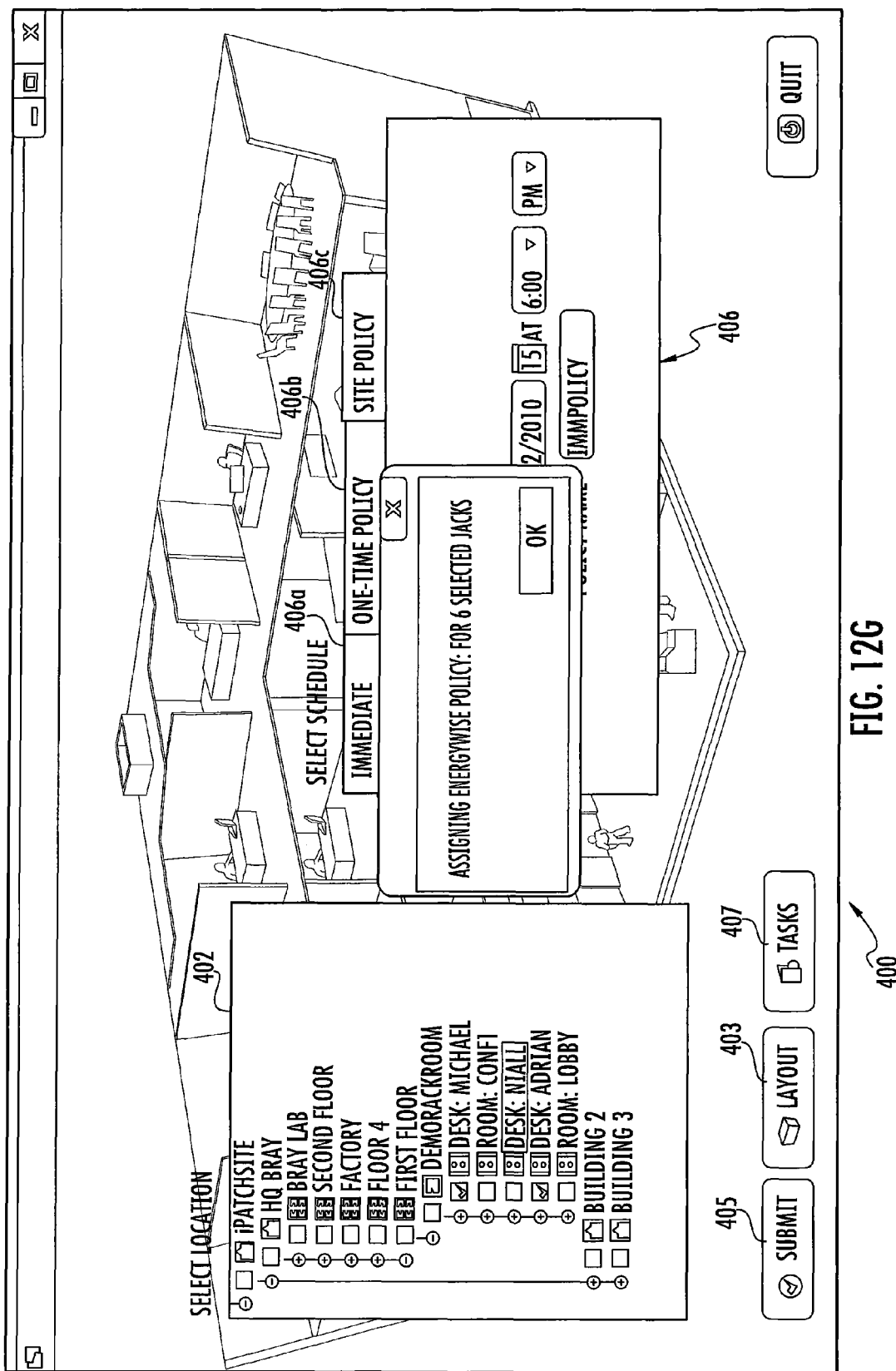

To implement the various EMPs defined in tabs 406a-406c, the user activates the "submit" GUI control 405. As illustrated in FIG. 12G, the EMPs are assigned to the wall jacks in the selected rooms.

Figure 13:
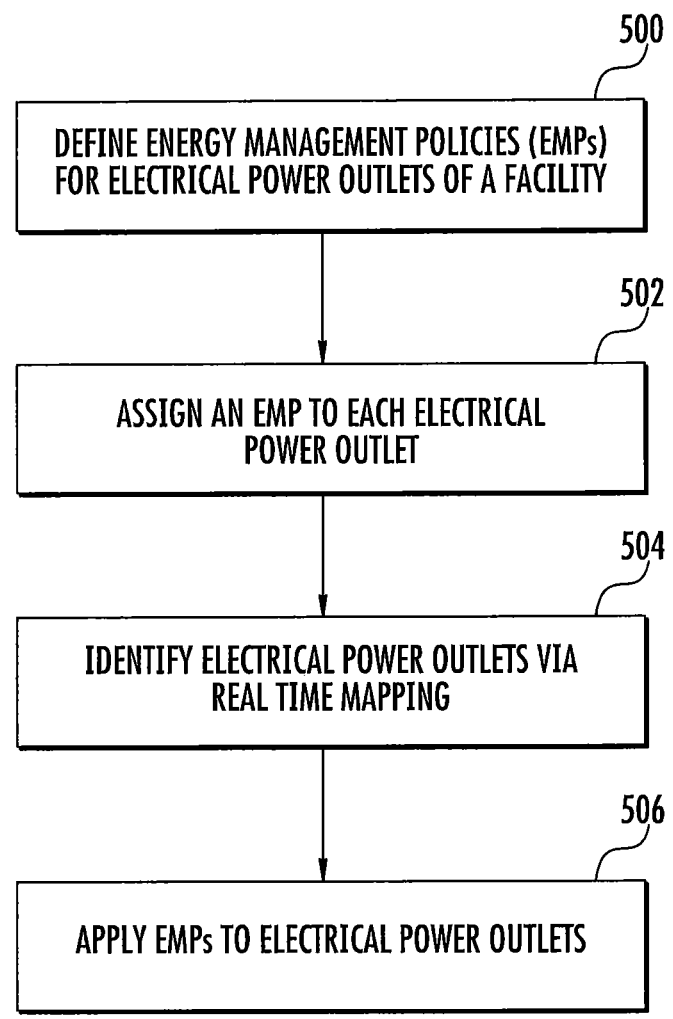
FIG. 13 is a flow diagram illustrating operations for implementing various embodiments of the present invention.

Referring to FIG. 13, operations for managing and monitoring electrical power to a plurality of electrical power outlets within a facility, according to some embodiments of the present invention, are illustrated. Initially, one or more EMPs are defined for the electrical power outlets of a facility (Block 500). An EMP is then assigned to each electrical power outlet in a facility (Block 502). Next, electrical power outlets are identified via real time mapping performed by an automated infrastructure management system (e.g., 100, FIG. 5) (Block 504).

The electrical power outlets and associated circuits are controlled and monitored via one or more power management devices. Each power management device includes one or more controllers that are connected to a communications network. Exemplary power management devices and systems that may be utilized in accordance with some embodiments of the present invention are available from Cyber Switching, Inc., San Jose, Calif., and described in U.S. Pat. Nos. 7,550,870 and 7,672,104, which are incorporated herein by reference in their entireties.

As described above, real time mapping may be achieved through data cabling information gathered from intelligent patch panels (12, FIG. 5), through SNMP data collected from network switches (52, FIG. 5), or through a combination thereof. As such, an automated infrastructure management system (100, FIG. 5) may have complete visibility of every electrical power outlet in a facility that is controlled/monitored by a network-connected power management device. The defined EMPs are then applied to the respective electrical power outlets (Block 506).

Figure 14:
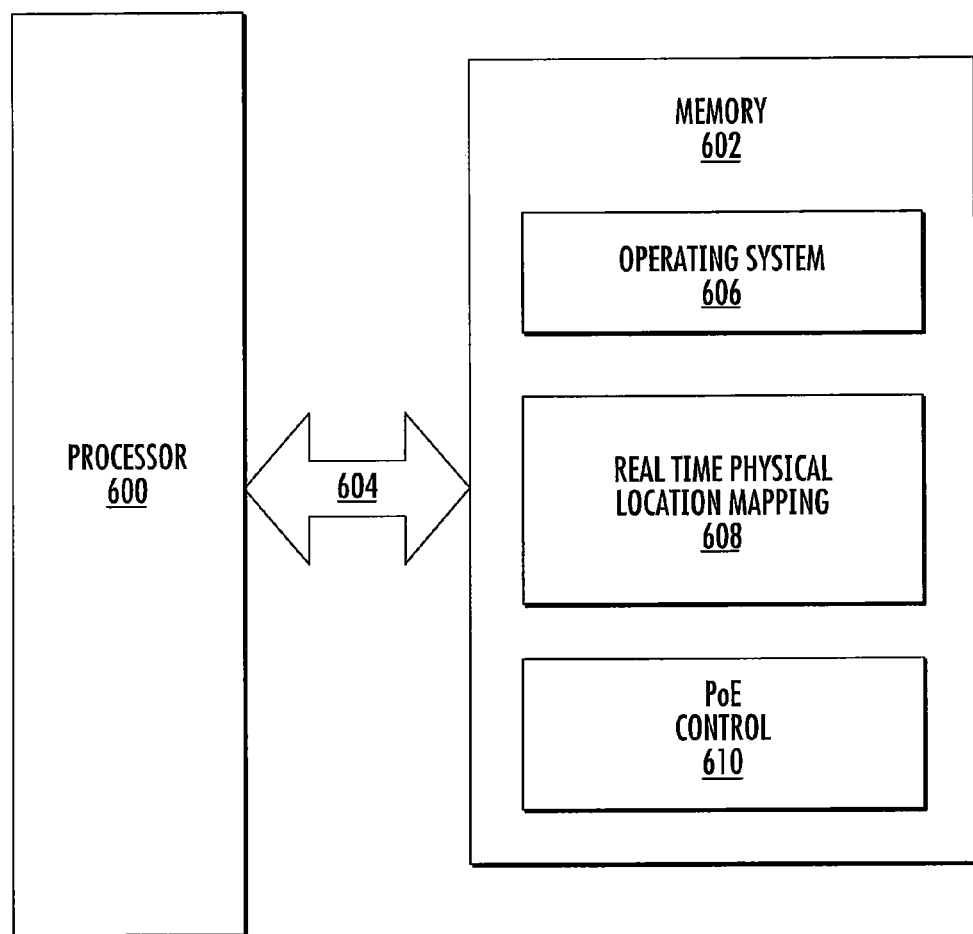
FIG. 14 is a block diagram that illustrates details of an exemplary processor and memory that may be used to implement the various functions of the management software of an automated infrastructure management system, according to some embodiments of the present invention.

FIG. 14 illustrates an exemplary processor 600 and memory 602 that may be used to perform the functions of the management software, according to some embodiments of the present invention. The processor 600 communicates with the memory 602 via an address/data bus 604. The processor 600 may be, for example, a commercially available or custom microprocessor. The memory 602 is representative of the overall hierarchy of memory devices containing the software and data used to implement an intelligent patching system as described herein. The memory 602 may include, but is not limited to, the following types of devices: cache, ROM, PROM, EPROM, EEPROM, flash, SRAM, and DRAM.

As shown in FIG. 14, the memory 602 may hold various categories of software and data: an operating system 606, a real time physical location mapping module 608, and a PoE control module 610. The operating system 606 controls operations of the management server 102 and coordinates execution of the various management software programs (e.g., the real time physical location mapping module 608, and a PoE control module 610, etc.) by the processor 600. The real time physical location mapping module 608 comprises logic for identifying powered devices that are connected to a network and displaying their physical location in real time. The PoE control module 610 comprises logic for turning PoE on and off at a corresponding network switch port according to an energy management policy assigned to the telecommunications outlet.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. An automated infrastructure management system, comprising:
 a plurality of intelligent patch panels, each comprising a plurality of connector ports connected to individual communication channels, wherein a telecommunications outlet is located at the end of at least some of the communication channels;
 a plurality of patch cords configured to selectively interconnect respective connector ports of the at least one intelligent patch panel with ports of at least one network switch;
 a processor in communication with at least some of the intelligent patch panels that obtains real time physical location information for the communication channels;
 memory coupled to the processor; and
 computer program code residing in the memory that, when executed by the processor, causes the processor to turn Power over Ethernet (PoE) on at a corresponding network switch port according to an energy management policy assigned to a telecommunications outlet in response to connection of a powered device to the telecommunications outlet.

2. The automated infrastructure management system of claim 1, wherein the computer program code further causes the processor to:
 automatically identify a network switch port that is connected to the telecommunications outlet; and
 apply an energy management policy assigned to the telecommunications outlet to the network switch port.

3. The automated infrastructure management system of claim 1, further comprising an access card reader connected to the network and located at a facility access point, and wherein the computer program code further causes the processor to:
 detect an access card read by the card reader and determine that a person associated with the access card is entering the facility;
 identify a physical location within the facility utilized by the person;
 identify a network switch port connected to the physical location; and
 turn PoE on for the identified network switch port.

4. The automated infrastructure management system of claim 1, further comprising an access card reader connected to the network and located at a facility access point, and wherein the computer program code further causes the processor to:
 detect an access card read by the card reader and determine that a person associated with the access card is leaving the facility;
 identify a physical location within the facility utilized by the person;
 identify a network switch port connected to the physical location; and
 turn PoE off for the identified network switch port.

5. The automated infrastructure management system of claim 1, wherein the computer program code further causes the processor to display a user interface that illustrates powered devices connected to the network in real time, and wherein an energy management policy can be defined and assigned to each powered device via the user interface.

6. The automated infrastructure management system of claim 1, further comprising a lighting controller connected to the network, wherein the lighting controller is configured to provide power to a plurality of lighting fixtures, and wherein the computer program code further causes the processor to display a user interface that illustrates the physical location of each lighting fixture, and to apply an energy management policy to each lighting fixture based on physical location.

7. The automated infrastructure management system of claim 6, wherein the computer program code further causes the processor to display a user interface that illustrates each lighting fixture connected to the network in real time, and wherein an energy management policy can be defined and assigned to each lighting fixture via the user interface.

8. The automated infrastructure management system of claim 1, further comprising an electrical power management device connected to the network that is configured to manage and monitor electrical power to a plurality of power outlets, and wherein the computer program code further causes the processor to identify an electrical power management device port connected to a corresponding power outlet.

9. The automated infrastructure management system of claim 8, wherein the computer program code further causes the processor to display a user interface that illustrates the physical location of each power outlet.

10. The automated infrastructure management system of claim 9, wherein the computer program code further causes the processor to define and assign an energy management policy to each power outlet via the user interface based on physical location.

11. A method of operating an automated infrastructure management system, wherein the system includes a plurality of patch panels having a plurality of connector ports connected to individual communication channels, wherein at least some of the communication channels terminate at a respective telecommunications outlet, a network switch that provides access to upstream network devices via a plurality of switch ports, a processor that monitors interconnections between the patch panels and the network switch, and a plurality of patch cords configured to selectively interconnect respective connector ports of the patch panel with the network switch ports, the method comprising:

automatically detecting connection of a powered device to the network via a respective telecommunications outlet;

automatically identifying a network switch port connected to the telecommunications outlet in real time; and turning Power over Ethernet (PoE) on or off at the network switch port according to an energy management policy assigned to the telecommunications outlet and/or telecommunications outlet location.

12. The method of claim 11, further comprising displaying a user interface that illustrates the powered device and identifies an energy management policy assigned to the powered device.

13. A method of operating an automated infrastructure management system, wherein the system includes a plurality of patch panels having a plurality of connector ports connected to individual communication channels, wherein at least some of the communication channels terminate at a respective telecommunications outlet, a network switch that provides access to upstream network devices via a plurality of switch ports, a processor that monitors interconnections between the patch panels and the network switch, a plurality of patch cords configured to selectively interconnect respective connector ports of the patch panel with the network switch ports, and an access card reader or a smart phone detection device connected to the network and located relative to a facility access point, the method comprising:

detecting an access card read by the card reader or detecting a smart phone by the smart phone detection device;

determining whether a person associated with the access card or smart phone is entering or leaving the facility;

identifying a physical location within the facility utilized by the person;

identifying a network switch port connected to the physical location; and turning PoE on for the identified network switch port if the person is entering the facility or turning PoE off for the identified network switch port if the person is leaving the facility.

\* \* \* \* \*